United States Patent [19]
Podowski et al.

[11] Patent Number: 5,524,272
[45] Date of Patent: Jun. 4, 1996

[54] METHOD AND APPARATUS FOR DISTRIBUTING PROGRAM MATERIAL

[75] Inventors: Robert R. Podowski, Mundelein; Mark S. Schneider, Naperville, both of Ill.

[73] Assignee: GTE Airfone Incorporated, Oak Brook, Ill.

[21] Appl. No.: 171,945

[22] Filed: Dec. 22, 1993

[51] Int. Cl.$^6$ ............... H04N 7/00; H04H 1/00
[52] U.S. Cl. ............. 455/3.2; 455/4.1; 455/6.3; 455/13.1; 348/8; 348/13
[58] Field of Search ............... 381/77, 79, 31, 381/80, 81, 82, 86; 370/50, 73; 369/6, 7, 10, 11, 13, 24, 29, 30, 83, 84, 85; 348/6, 7, 8; 455/3.1, 3.2, 4.1, 4.2, 6.3, 7, 12.1, 11.1, 13.1, 18, 31.1, 32.1, 33.1, 53.1, 54.1, 66; 364/400, 410, 478, 479; 340/825.25; H04N 7/10

[56] References Cited

U.S. PATENT DOCUMENTS

| | | | |
|---|---|---|---|
| 4,789,863 | 12/1988 | Bush | 340/825.25 |
| 4,864,301 | 9/1989 | Helferich | 347/110 |
| 4,905,003 | 2/1990 | Helferich | 341/110 |
| 4,975,771 | 12/1990 | Kossatly | 348/385 |
| 5,003,576 | 3/1991 | Helferich | 379/88 |
| 5,234,540 | 8/1993 | Rouira et al. | 455/66 |
| 5,262,875 | 11/1993 | Mincer et al. | |
| 5,289,272 | 2/1994 | Rabowsky et al. | 455/6.3 |
| 5,355,302 | 10/1994 | Martin et al. | 364/410 |
| 5,404,567 | 4/1995 | DePietro et al. | 455/6.3 |

FOREIGN PATENT DOCUMENTS

| | | | |
|---|---|---|---|
| 0015508 | 12/1990 | WIPO . | |
| 0020082 | 12/1991 | WIPO . | |
| 0010606 | 5/1993 | WIPO | 370/73 |

OTHER PUBLICATIONS

E. Andrews, "Betting Big on Small–Dish TV", New York Times, pp. C1,C7 (Dec. 15, 1993).
J. Shiver Jr., "Beating Swords into Sitcoms.", Los Angeles Times, pp. D1,D3 (Nov. 21, 1993).
P. Tyler, "CNN and MTV Hanging by a 'Heavenly Thread'", New York Times, p. A4 (Nov. 22, 1993).
Andrews, Edmund L., "Big Risk and Cost Seen in Creating Data Superhighway," The New York Times, Jan. 3, 1994, p. C17.

*Primary Examiner*—David E. Harvey

[57] ABSTRACT

A communication system includes a distribution center which collects and processes signals from one or more program sources, and distributes these signals in compressed format to one or more airline terminals, each terminal in communication with one or more parked aircraft. An airline issues a program request identifying certain ones of the program sources, and sends this request to the distribution center where a composite signal is prepared including representations of the program source signals and the program request. The composite signal is transmitted to receiver units at subscriber airline terminals of airports where individual program orders are stored and subsequently distributed to the appropriate aircraft for subsequent in-flight playback of the programs.

16 Claims, 6 Drawing Sheets

5,524,272

METHOD AND APPARATUS FOR DISTRIBUTING PROGRAM MATERIAL

FIELD OF THE INVENTION

The present invention relates to communication systems and, more particularly, to a system for selectively distributing program materials from program and information sources (hereinafter program sources) to remote sites.

SUMMARY OF THE INVENTION

In one aspect of the present invention, a system for distributing inflight program material, such as video, audio, and data, to a first storage device located on an aircraft parked at an airport gate, for subsequent inflight playback, comprises apparatus for combining time compressed program material into a composite signal; a transmitter coupled to said apparatus, adapted to be coupled to a first communication link, for transmitting on said first communication link said composite signal to an airport; a receiver located at said airport, adapted to be coupled to said first communication link, for receiving said composite signal; a second storage device coupled to said receiver for storing said composite signal; and a second communication link for coupling said composite signal from said second storage device to said first storage device located on an aircraft parked at an airport gate, for subsequent inflight playback.

In another aspect of the present invention, a method of distributing program material from one or more program sources to an airport terminal in communication with one or more aircraft comprises the steps of providing a menu with program items from one or more program sources; generating program orders each identifying certain of said program items; preparing a composite package including the menu and the program orders; transferring the composite package to said terminal; and distributing the program items in said transferred package from said terminal to the respective aircraft.

In another aspect of the present invention, a system for distributing signals from one or more program sources to an airline terminal in communication with one or more aircraft comprises a receiver means for receiving signals from said one or more program sources; means for generating program orders each identifying certain of said signals; and means for transmitting the received signals and said program orders to said airline terminal.

In yet another aspect of the present invention, there is provided a communications system including: means for transmitting a control channel and one or more information channels as a composite spectrum to an airport having one or more airline terminals, each terminal serving non-airborne aircraft; receiver means at said airport for receiving said composite spectrum; a video server at each of said airline terminals comprising control means coupled to the airport receiver means for decoding the control channel of said composite spectrum into control and routing signals; detection means responsive to the control signals for recovering from said composite spectrum selected segments of the information channels in accordance with certain of said control signals; storage means for storing the selected segments of said information channels; a memory array having a plurality of storage buffers; transfer means responsive to certain of said control signals for transferring individual ones of said selected information segments to respective ones of said storage buffers in accordance with said certain control signals; and memory access and distribution means responsive to the routing signals for accessing said storage buffers and distributing the selected information segments stored therein to ones of said aircraft.

DETAILED DESCRIPTION OF THE PREFERRED EMBODIMENTS

Figure 1:
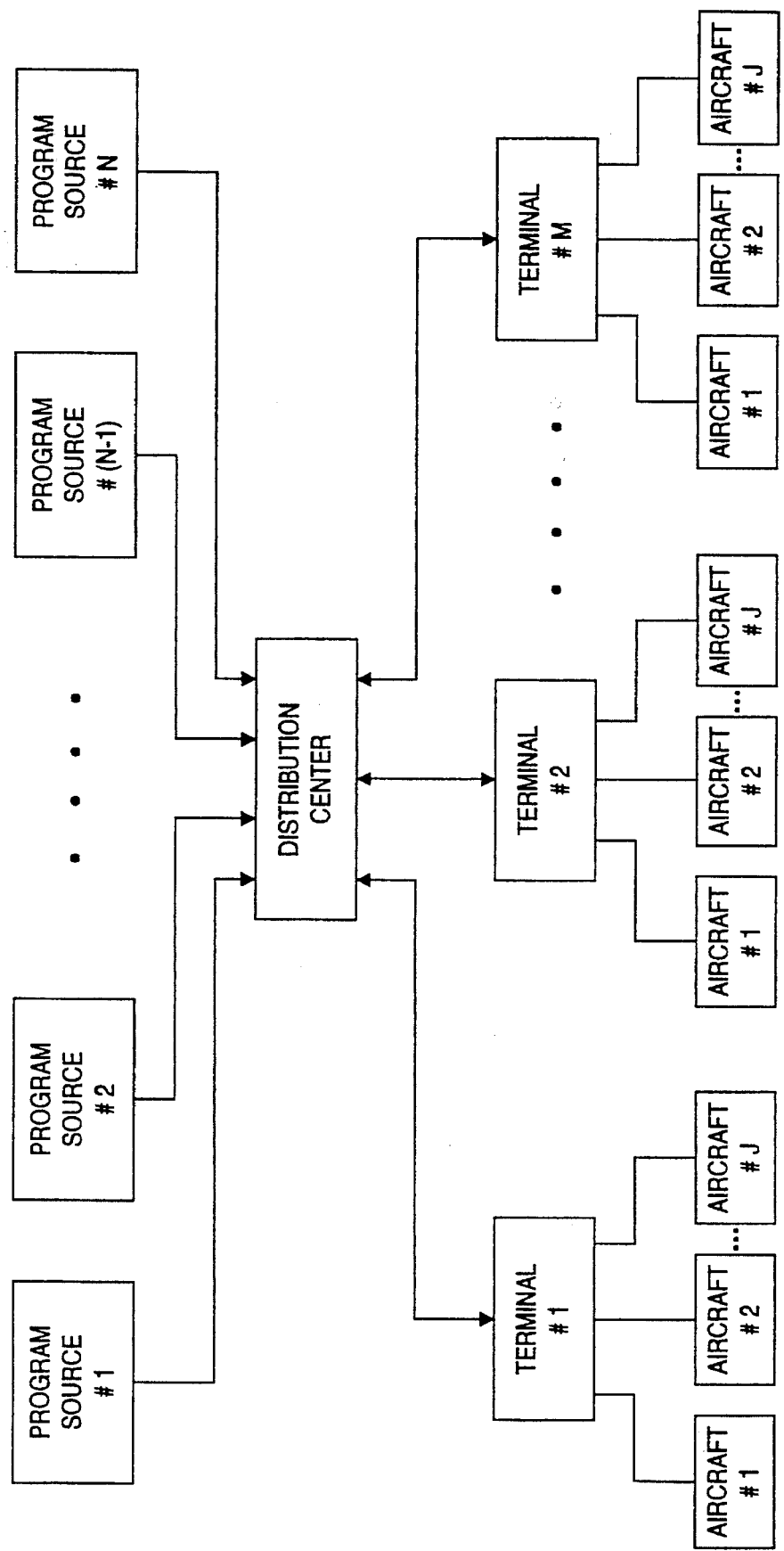
FIG. 1 is a block diagram representation of a signal distribution system in accordance with the present invention.

FIG. 1 is a block diagram representation of a preferred embodiment of a signal distribution system in accordance with the present invention. The system includes a distribution center 10 functioning as a program collection facility for collecting and processing signals from one or more program sources $1_S$ to $N_S$, and distributing these signals to one or more hub stations $1_H$ to $M_H$, each connected to one or more remote sites $1_R$ to $J_R$. In the preferred embodiment represented in FIG. 1, the hub stations correspond to airline terminals and the remote sites correspond to the individual aircraft of a particular airline. FIG. 1 illustrates an example of a configuration for a single airport, although the present invention may be designed to service multiple airports if so desired.

Figure 2:
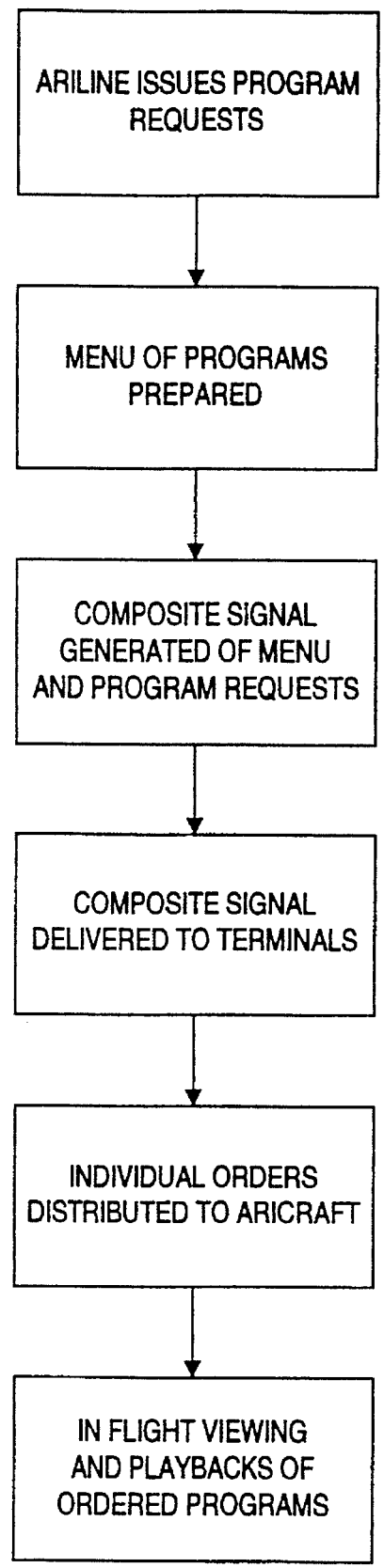
FIG. 2 is a flowchart representing the operating sequence of the FIG. 1 system.

FIG. 2 is a flowchart outlining the operational sequence of a preferred method for utilizing a system such as that depicted in FIG. 1.

The individual airlines review a schedule of program material available for selection from the program sources, and issue a program request identifying selected programs. Each program request reflects the individual program requirements for the airline and its viewing audience collectively designated as the plurality of aircraft 1 to J. The program requirements for a specific aircraft are hereinafter denoted a program order; accordingly, the program request issued by an airline represents an accumulation of program orders each assigned to an individual aircraft.

The distribution center 10 prepares a program menu constituting a collection of the signals from program sources $1_S$ to $N_S$. As used hereinafter, the term "program menu" will refer to any identification or representation of the signals collected from the program sources $1_S$ to $N_S$. The program requests from the individual airlines are forwarded to the distribution center where a composite signal is generated including a representation of the program menu and the program requests. In particular, the program requests are embodied in a control channel which includes an identification of the programs selected by each airline, and routing information indicating how the selected programs of an airline are to be organized into individual program orders assigned to specific aircraft. The composite signal is transmitted to receiver units at subscriber airline terminals of airports where the individual ordered programs are stored and redistributed to the appropriate aircraft where it is stored for subsequent in-flight replay. The ordered programs are suitably processed within the aircraft to permit in-flight playback of the program material.

Figure 3:
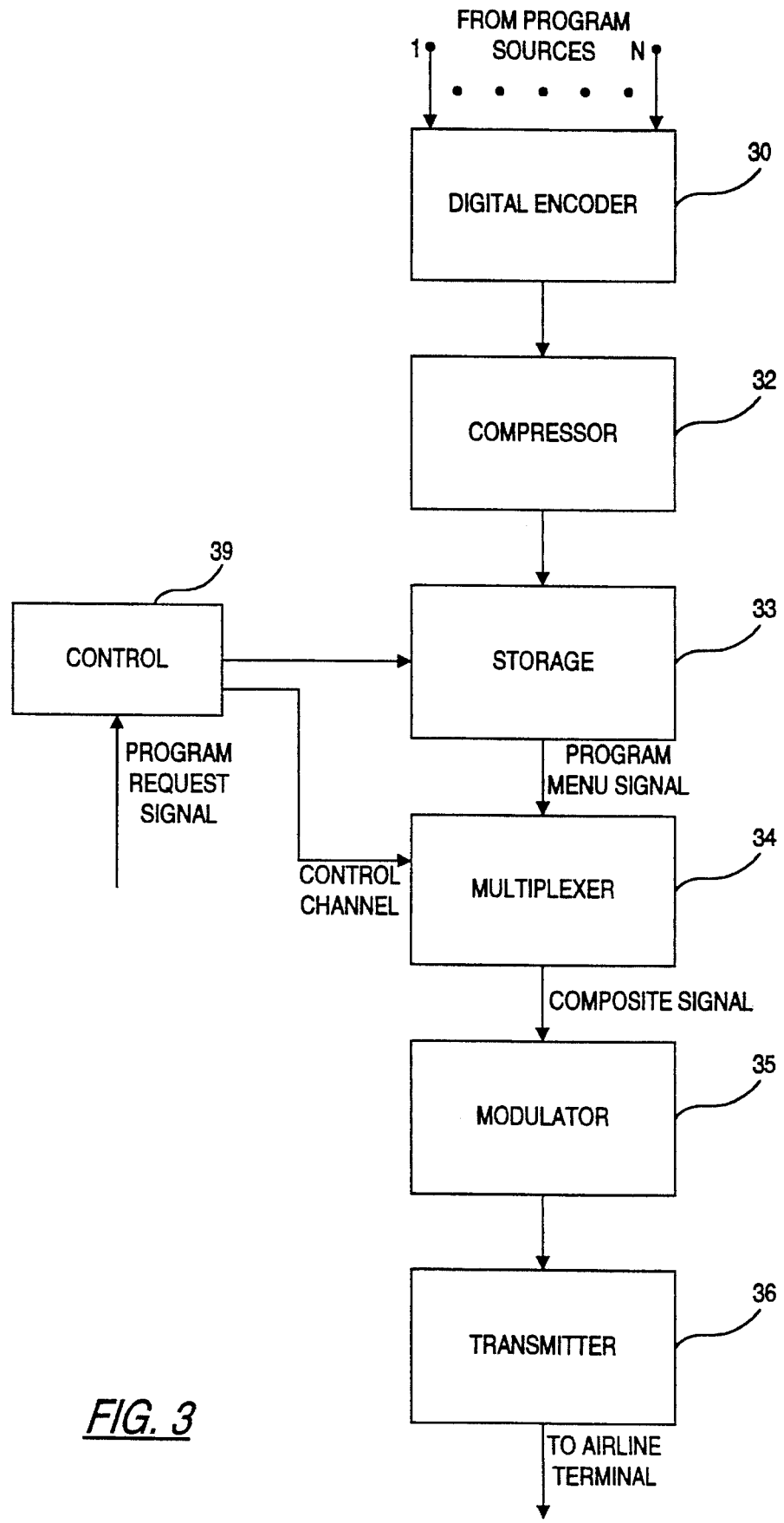
FIG. 3 is a block diagram representation of a preferred distribution center useful in the present invention.

FIG. 3 is a block diagram representation of a preferred embodiment of a distribution center. In general, a distribution center accomplishes the functions of digitizing incoming signals from program sources $1_S$ to $N_S$ into a format suitable for processing, compressing the signals (if so desired), multiplexing the program menu with the program requests issued by the airlines to produce a composite signal, and modulating the composite signal for transmission in a format compatible with the communications media employed by the airline and/or airline terminals. The inclusion of specific program items in the program menu is based upon the availability of each program from its respective source. The program menu and a control channel are delivered to each airline and/or airline terminal via transmitter 36 for selective detection of the programs ordered and distribution to the aircraft.

The signals furnished by the program sources $1_S$ to $N_S$ will ordinarily be in analog format. Accordingly, the distribution center further includes digital encoder 30 for receiving a plurality of analog program signals $1_S$ to $N_S$ from the N program sources and encoding the signals into equivalent digital representations to define a digital program library. Also, at least some of the signals may be generated in a digital format and transmitted to the distribution center in accordance with any type of communications protocol.

The digital programs are then compressed by compressor 32 using a suitable compression algorithm to minimize storage requirements and transmission bandwidth. One such coding algorithm for video compression is the algorithm supported by the International Standards Organization (ISO) Moving Pictures Export Group (MPEG) denoted MPEG-1 and MPEG-2. The compressed digital signals are placed in storage area 33. In a preferred implementation, the compressor 32 is from the CL4000 series MPEG encoder available from C-Cube Microsystems, Milpitas, Calif.

As will be discussed infra in greater detail in connection with FIG. 4, the airlines and/or airline terminals are each equipped with a respective video server (see FIG. 4) for implementing the airline and/or airline terminal receiver units referred to in connection with the discussion of FIG. 2. The video server preferably includes means for receiving the program menu downloaded from the distribution center, acquiring the appropriate routing and program request information from the control channel, and preparing individual aircraft orders pursuant to the program request information. The video server distributes the ordered programs among the fleet of aircraft pursuant to the routing information, discussed infra in regard to FIG. 4.

Referring to FIG. 3, the program selections made by the airlines are forwarded to the distribution center, and are collectively designated as a program request signal. Although the distribution center may include means for transmitting individually prepared packages to each airline and/or airline terminal including only the programs requested by that particular airline and/or airline terminal, the distribution center preferably generates a composite signal representing all of the packages ordered.

If the distribution center prepares the composite signal to include the requested programs of all airlines and/or airline terminals, the individual airlines and/or airline terminals must be equipped with apparatus to identify and selectively retrieve from the spectrum, in the case of frequency multiplexing, those digital signals corresponding to the requested programs. In order to facilitate such retrieval and identification, the composite signal preferably includes a control channel conveying information about the location of particular programs within the spectrum, the identity of the requesting party (e.g., airline), and identification of the requested programs. The airline/and or airline terminal can acquire its requested programs by decoding the control channel and using the decoded control information to recover the digital signals corresponding to the ordered programs. The recovered digital programs may then be distributed to the aircraft in accordance with the routing information (e.g., remote site addresses) embodied in the control channel. As an example of alternative configurations in keeping with the present invention, the signals may be TDMA with routing information in headers, or CDMA.

Figure 6:
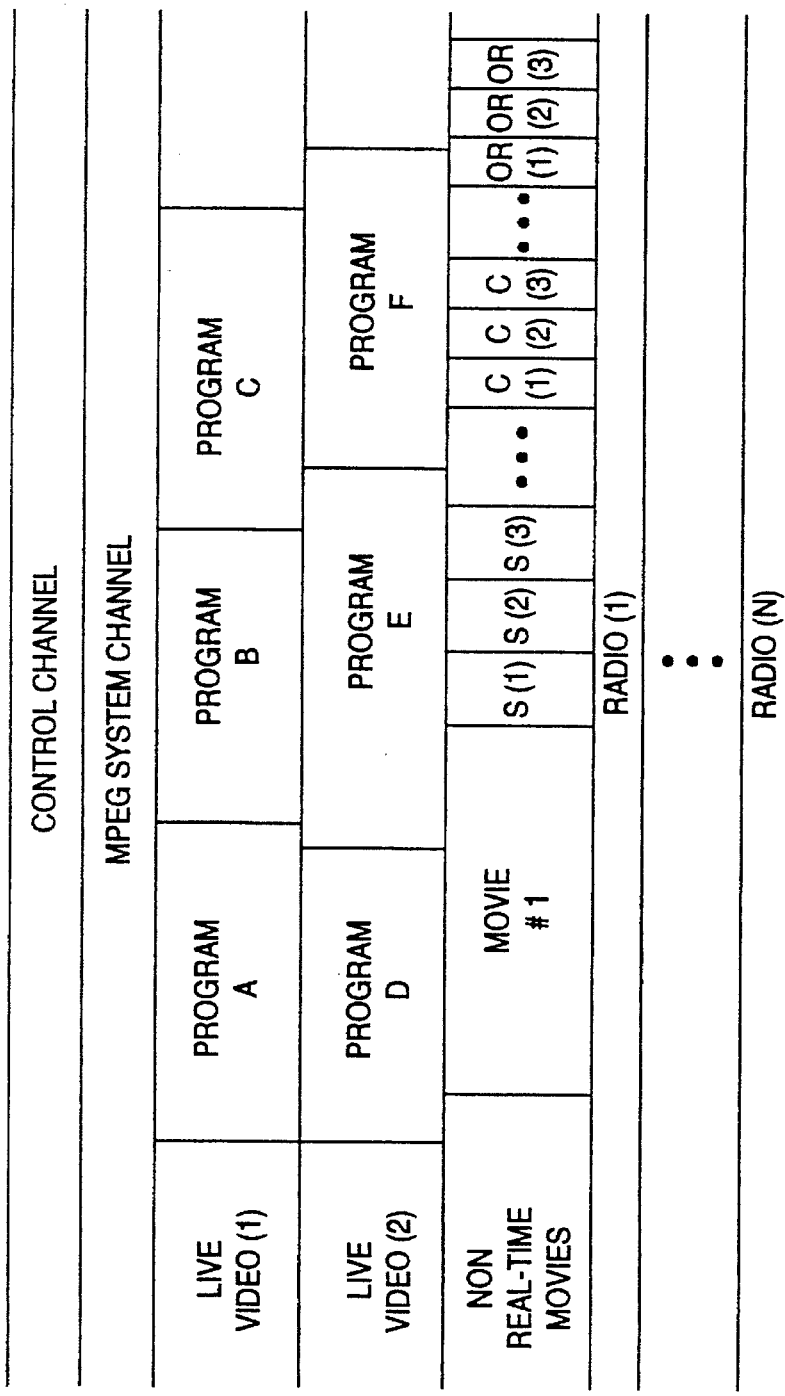
FIG. 6 is an example of a signal spectrum illustrating the digital channels transmitted by a program collection facility.

A control unit 39 is responsive to the program request signal for generating the aforementioned control channel. The compressed digital programs stored in storage area 33 are transferred as a program menu signal to a suitable multiplexer means 34 to produce a composite digital signal including the control channel. An example of a composite digital spectrum generated in accordance with the present invention is shown in FIG. 6, discussed infra. The composite spectrum is appropriately modulated and then transmitted over suitable communications media to the one or more airlines and/or airline terminals.

In a preferred implementation, transmission to individual airlines and/or airline terminals is carried out over a satellite link using commercially available ground stations at the distribution center and at the terminals. In this situation, transmitter 36 includes an apparatus (e.g., an RF frequency converter) to upconvert the composite signal to a level suitable for satellite transmission. For example, upconversion from baseband to 14 GHz may be implemented by a satellite modem for transmission with a 3.7 meter antenna. The transmission apparatus, however, is not limited to any particular implementation, but may include equipment compatible with satellite, microwave, cellular, or telephone transmissions according to the available media and the bandwidth requirements.

The configuration of receiver equipment at the terminal will vary depending upon the specific operating environment. For example, if the digital spectrum is transmitted over microwave links, the receiver equipment will require means to frequency downconvert the signal to a frequency compatible with the available signal processing equipment, and means to demodulate the signal. Beyond these basic receiver requirements for detecting the signal so as to furnish a digital signal suitable for processing, the receiver equipment may entail a number of configurations.

Figure 4:
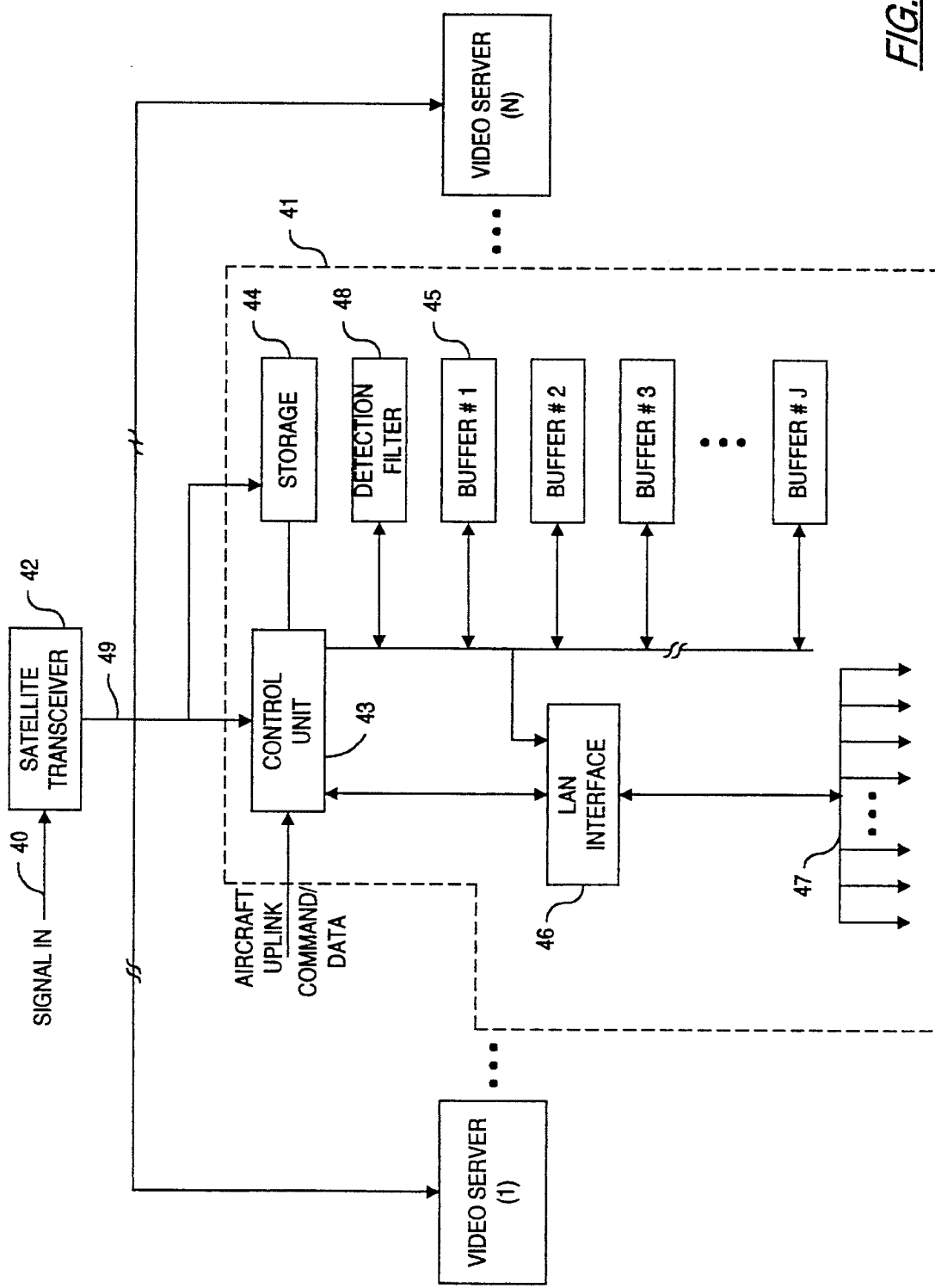
FIG. 4 is a block diagram representation of a preferred video server unit useful in the present invention.

FIG. 4 illustrates in block diagram format a preferred embodiment of the receiver apparatus at the airlines and/or airline terminals. A video server unit, illustrated diagrammatically as unit 41, is assigned to each airline and/or airline terminal. In a preferred embodiment, the video server may be represented as a memory array storing a catalog of files corresponding to ordered programs, with a control means for accessing the array and a transfer means for routing the programs to designated aircraft. Since the distribution center preferably transmits the composite signal over a satellite link (e.g., downlink), which may include a relay center such as a transponder to deliver the composite signal to each of the airline and/or airline terminal receiver units via a downlink channel, the airport is equipped with an antenna (e.g., 1.8 meter-not shown), a low noise block converter for frequency downconversion (e.g. from 12 GHz to 1.5 GHz-not shown), a satellite transceiver 42 for RF reception, and a demodulator, if necessary (not shown). In a preferred implementation, the video server includes data storage unit such as a large scale memory for storing a catalog of files corresponding to ordered programs.

Referring now to FIG. 4 for a detailed discussion of a preferred video server, a satellite transceiver 42 is coupled to the downlink channel of the satellite link via input line 40. The transceiver 42 (preferably implemented as a satellite modem) performs RF detection of the incoming composite signal to produce the original composite digital baseband spectrum on output line 49. Each video server unit (1 to N) may be furnished with an identical version of the composite digital signal wherein each video server unit is assigned to a respective airline and/or airline terminal.

The illustrated video server 41 includes a control unit 43, storage area 44, one or more buffers (1 to J), one of which is designated in FIG. 4 as 45, detection/filter unit 48, local area network (LAN) interface 46, and distribution network 47. The entire composite digital baseband signal is stored within storage area 44. However, since the composite digital baseband signal may include signals for programs requested by other airlines and/or airline terminals, detection/filter unit 48 is used to selectively detect portions of the composite digital signal which correspond to selected programs identified in the program request issued by the relevant airline. Thus, unit 48 performs selective spectral acquisition as directed by control unit 43. Moreover, these requested programs should be further partitioned according to the individual orders of each aircraft. Accordingly, a further level of selection is desired to organize the digital signals into a group of program orders each dedicated to a respective aircraft. The control unit 43 decodes the control channel embodied in the composite digital baseband signal, and acquires the program information identifying the program orders requested by the airline and the routing information designating the individual aircraft receiving the ordered programs. The detection/filter unit 48 operates under the supervision of control unit 43.

Storage unit 44 is preferably a large scale memory array capable of storing the entire digital program menu. As a complement to the memory function of unit 44 and for implementing individual program group organization, each buffer stores an individual program reserved for an aircraft. In response to an access command from control unit 43, the programs stored in the buffers are routed through LAN interface 46 to the network 47 for distribution to the appropriate aircraft. In particular, the LAN interconnects each aircraft of a certain airline to the airline's video server unit. The LAN interface 46 connection may be replaced by other suitable communications media such as a wireless link. The network may be implemented with coaxial cable or other conventional media.

As indicated above, the digital representations of the program sources are compressed with MPEG schemes in the distribution center. Each video server implements a further level of time compression by transferring the program material at an accelerated rate to the designated aircraft. For example, a 1 Mb/s real-time signal is transmitted at 10 Mb/s by loading programs from the video server into the memory for the aircraft at a high speed, thereby making it possible to increase the amount of program material being transferred during the fixed downloading interval. This interval is preferably during the time period when the aircraft is at the terminal gate, and is being prepared for the next flight. The compression may be implemented, for example, by using a clock during information transfer which is faster than the real-time data rates of the stored digital signals. The aircraft includes equipment illustrated in FIG. 5 for decompressing the compressed program material and implementing real-time playback. The control unit 43 manages the transfer rate and therefore determines the extent of compression which may be desired.

In one example of an implementation, control unit 43 is preferably a modified 486/33 microprocessor assembly managing the LAN interfaces and the transfer of digital program files from storage area 44 via detection/filter unit 48 to the buffers. Detector/filter unit 48 is preferably implemented as a software routine embodied in firmware or as a programmable device (such as a DMA device) for separating out selected digital segments from storage 44 for placement in the buffers pursuant to control signals from control unit 43. Storage area 44 is preferably a MegaDrive tape unit with capacity sufficient to store the entire composite digital baseband signal. Each buffer is preferably a 2.1 Gb MegaDrive Unit. The LAN interface 46 is preferably an ANSI FDDI ML 6671 transceiver (125 Mb/s) available from MicroLinear Corp. The network 47 is preferably a DataCom Warehouse category 5 cable EIA/TIA.

Although what has been described above is program downloading from the video server to respective aircraft, the present invention may provide bidirectional data communication between the video server and aircraft. In particular, once the aircraft lands and is stationed at a gate, for example, a connection is made between LAN interface 46 and LAN interface 50 via network 47. The aircraft will send addressing information to the control unit 43 as an aircraft uplink command for identifying itself and initiating program download from the respective video server buffer. However, the aircraft may also send data to the video server. For example, the aircraft may send maintenance information to the video server as aircraft uplink data, which control unit 43 would package and deliver to the terminal mechanics warehouse over network 47 to initiate aircraft repair work in accordance with the maintenance information.

Figure 5:
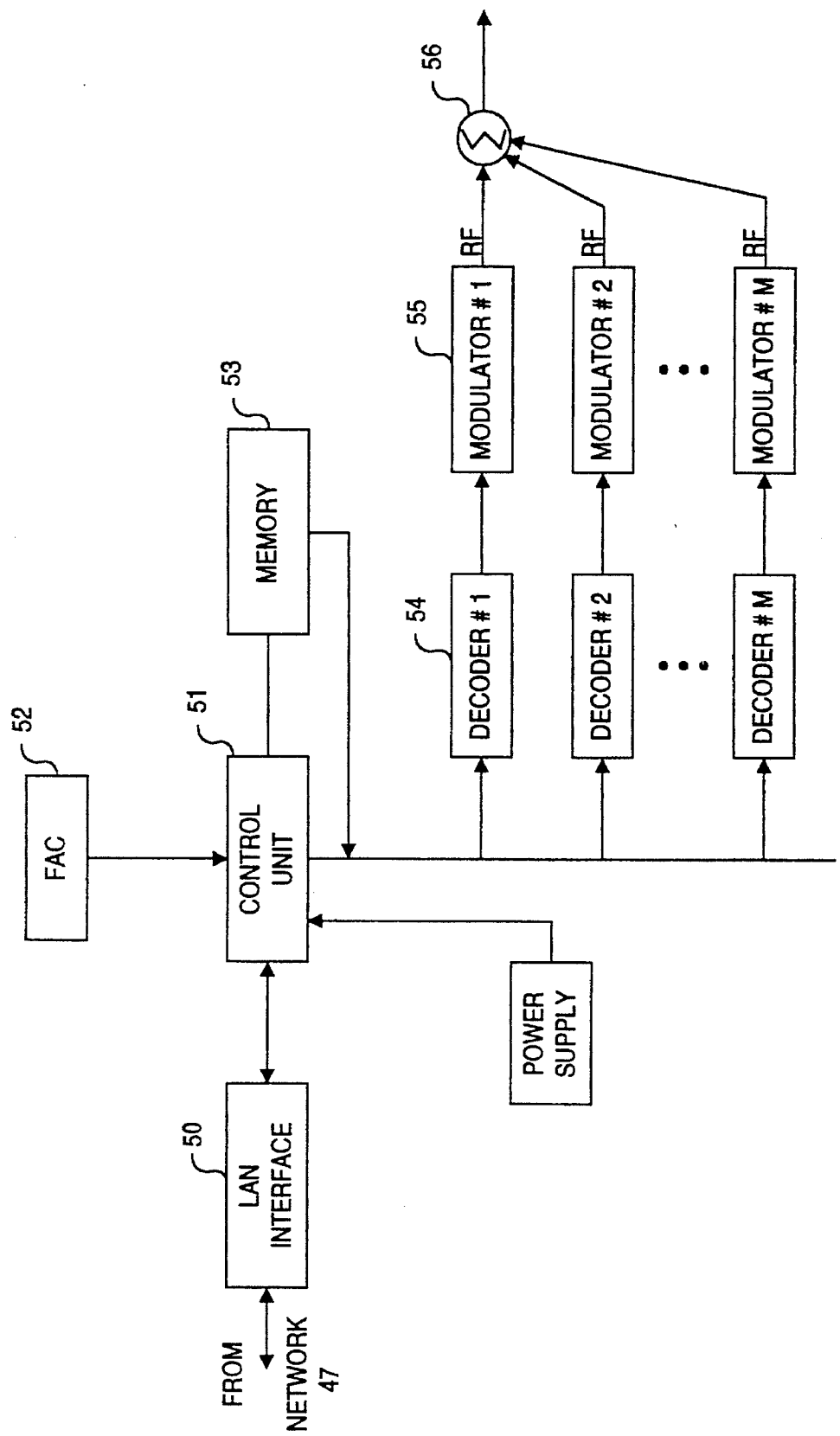
FIG. 5 is a block diagram representation of a preferred on-board aircraft unit in communication with the preferred video server unit of FIG. 4.

FIG. 5 diagrammatically illustrates the on-board aircraft equipment used to receive the ordered programs program order from the respective video server unit and distribute the program materials within the aircraft. A LAN interface 50 is coupled to a respective output connection of network 47 in FIG. 4. A control unit 51 manages the distribution of the incoming ordered programs within the aircraft. The control unit 51 becomes operable in response to an initiation sequence provided by flight attendant controller (FAC) 52 which controllably engages unit 51 to commence in-flight distribution of the program material. A memory area 53 stores the ordered programs and is accessed under supervision of the control unit.

The digital program materials were preferably compressed at the distribution center and by the video server during transfer to the aircraft. Accordingly, one or more decoder units (1 to M) are provided to decompress the compressed digital signals so that playback is made possible in virtual real-time. After decompression, each signal is converted to its analog equivalent, appropriately modulated by a modulator (1 to M), and multiplexed by combiner 56 for transmission within the aircraft via a suitable medium such as cable. The in-flight viewing equipment preferably employs NTSC, PAL, or SECAM frequencies to provide signals suitable for viewing. If the viewing equipment is capable of receiving programs in digital format, the intermediate analog electronics will be unnecessary.

In a preferred implementation, the FAC 52 includes a channel selector, a power-ON indicator, and a fault indicator.

Control unit 51 is preferably a modified 486/33 for managing LAN interface 50, reading control signals from FAC 52, identifying itself to the video server when connected, loading program files into memory 53, and playing the files to the decoders. The interconnection between network 47 of FIG. 4 and LAN interface 50 is preferably a 100 Mb/s FDDI cable, with interface 50 preferably being an ANSI FDDI ML6671 transceiver (125 Mb/s) from MicroLinear Corp. The memory 53 is preferably a MegaDrive 2.1 Gb device having a SCSI-2 interface coupled to control unit 51 over a 32-bit EISA bus. Memory 53 preferably includes a supervisory controller (not shown), such as a 3000-BAF controller (5 Mb/s). Decoder 54 is preferably an SGS Thomson STi 3500 MPEG1/MPEG2 device preferably coupled to an Analog Devices AD720 for RGB to NTSC/PAL frequency conversion, and modulator 55 is preferably a Philips digital decoder furnishing an RF signal to the passengers' playback devices.

FIG. 6 illustrates an example of a series of digital channels transmitted as a composite spectrum by the distribution center. Although specific program sources and data rates are presented to further an understanding of FIGS. 4 and 5, these examples are for illustrative purposes only and should not serve as a limitation of the present invention. Rather, it should be apparent to those skilled in the art that the present invention may encompass a wide range of program material and data rates.

As discussed above, each terminal video server unit has the capability of receiving information from one or more program sources (1 to N). Consequently, the present invention achieves its fullest advantages when access is possible to a wide range of programs or other information sources. For example, the program sources may furnish materials such as radio programs, television signals, advertising/sales information, movies, and other events including news or sports broadcast. These sources may supply the signals in virtual real-time, such as for selected sporting events or news broadcasts, or in a delayed transmission format suitable for such programs as movies, safety films, promotional clips, commercial inserts, or archival material. Additionally, the sources may furnish in-flight instructions for the flight attendants or educational program material to be interactively executed on the aircraft.

The composite spectrum includes a digital control channel to engage the receivers at the remote sites (e.g., aircraft), provide synchronization information, furnish remote site routing information, and implement other control functions. For example, the control channel may include addressing information indicating which portions of the spectrum are to be distributed to the respective video servers. The spectrum further includes an MPEG system channel for managing the separation of the three (3) illustrated video channels and the accompanying illustrated radio channels (1–N) constituting an audio spectrum.

The illustrated video portion of the composite spectrum includes three separate video channels representing two live video programs and one non real-time program offering. The live video channel (1) may include segments A, B, and C, each corresponding to a respective program. For example, each program may be one of the shows available on broadcast television. Likewise, live video channel (2) may include programs available on cable broadcast stations. Although the live video presentations on an aircraft are not truly "live" to the extent that the in-flight viewing does not actually coincide with their counterpart transmissions on the broadcast airwaves, the in-flight viewing may be considered a virtual real-time broadcast presentation if the time for program collection and distribution to the airline terminals is minimized so that a minimal delay exists between real-time broadcast and in-flight viewing.

The third illustrated video channel is for programs which by their content may be viewed in a non-real time manner. For example, a movie already appearing on public screens and now available in rental stores is a suitable candidate for this channel. The non-real time channel may also include safety subchannels S(1)–(3), airline-specific commercials C(1)–(3), and order channels OR(1)–(3) from which viewers may make individual viewing decisions of selected items from the entire array of ordered programs. Each of the safety features, commercials, and ordering information is forwarded as an integrated package to the aircraft. For example, the video programs represented by spectral segments S(1), C(1), and OR(1) are packaged as a single video segment and transmitted to the appropriate aircraft. The composite spectrum further includes an audio portion comprising radio channels conveying the audio information for the video channels.

While there has been shown and described herein what are presently considered the preferred embodiments of the invention, it will be apparent to those skilled in the art that various changes and modifications can be made therein without departing from the scope of the invention as defined by the appended claims.

We claim:

1. A method of distributing a plurality of program signals from respective program sources to an airport terminal in communication with a plurality of aircraft, comprising the steps of:

collecting said program signals from said respective program sources at a distribution center;

generating at said terminal a program request constituting a plurality of program orders assigned to respective ones of said aircraft, each of said program orders identifying certain of said program signals;

forwarding said program request to said distribution center:

preparing at said distribution center a composite package including said collected program signals and said program request;

transferring said composite package to said terminal; and distributing said collected program signals in said composite package from said terminal to said aircraft in accordance with said program orders.

2. The method as recited in claim 1 further includes the steps of:

converting said program signals when in analog form into a digital program format; and compressing said digital program format to create a compressed digital program format.

3. The method as recited in claim 2 wherein the step of preparing said composite package includes the steps of:

creating an index that correlates said program orders with addressing information indicative of a destination aircraft for each of said program orders;

combining said compressed digital program format with data carried by an encoded digital control channel to form a composite digital signal;

said encoded digital control channel including said index.

4. The method as recited in claim 1 wherein the transferring step includes the steps of:

modulating said composite digital signal into a satellite-compatible transmission format to create a modulated signal; and transmitting said modulated signal to said terminal over a satellite link.

5. The method as recited in claim 3 wherein the step of distributing said collected program signals includes the steps of:

decoding said encoded digital control channel into said addressing information; transmitting said said collected program signals to said aircraft in accordance with said decoded addressing information.

6. The method as recited in claim 5 wherein:

certain of said program sources furnish program signals based on real-time video presentations; and certain of said program sources furnish program signals from archival video presentations.

7. A system for distributing program signals from respective program sources to an airline terminal in communication with a plurality of aircraft, comprising:

receiver means, located at a distribution center, for receiving said program signals from said respective program sources to form a plurality of received program signals;

means, located at said terminal, for generating a program request constituting a a plurality of program orders assigned to respective ones of said aircraft, each of said program orders identifying certain of said received program signals;

means for forwarding said program request to said distribution center;

means, located at said distribution center, for transmitting said received program signals and said program request to said airline terminal; and means for distributing said transmitted program signals from said terminal to said aircraft in accordance with said program orders.

8. The system as recited in claim 7 further comprising:

encoder means, located at said distribution center, for digitally encoding said received program signals to form a plurality of encoded signals, said encoder means being electrically connected between said receiver means and said means for generating said program request;

compression means, located at said distribution center, for compressing said encoded signals to form a plurality of compressed encoded signals;

means, located at said distribution center, for generating a composite signal including said compressed encoded signals and a control channel including said program request; and modulation means, located at said distribution center, for modulating said composite signal.

9. The system as recited in claim 8 further comprising detection means located at said airline terminal and adapted to receive said composite signal to form a received composite signal; and wherein said distributing means further comprises means, located at said airline terminal, for routing said compressed encoded signals embodied in said received composite signal to said aircraft.

10. The system as recited in claim 9 wherein said detection means comprises: means for demodulating said received composite signal.

11. The system as recited in claim 9 further comprising:

storage means, located at said terminal and coupled to the detection means, for storing said received composite signal; and a plurality of buffer means located at said terminal and each storing certain of said compressed encoded signals embodied in said received composite signal.

12. The system as recited in claim 11 further comprising:

means, located at said aircraft, for receiving said compressed encoded signals from one of said plurality of buffer means to form a plurality of received compressed encoded signals;

means, located at said aircraft, for decompressing and decoding said received compressed encoded signals into a plurality of analog signals.

means, locate at said aircraft, for modulating said plurality of analog signals to form a plurality of modulated signals; and means, located at said aircraft, for distributing said modulated signals to individual user terminals throughout said aircraft.

13. The system as recited in claim 7 wherein said program signals include real-time video presentations and archival video presentations.

14. In a communications system including means for transmitting a control channel and an information channel as a composite spectrum to an airport having one or more airline terminals, each terminal serving non-airborne aircraft; receiver means at said airport for receiving said composite spectrum; a video server at each of said airline terminals comprising:

control means coupled to the airport receiver means for decoding the control channel of said composite spectrum into a control signal and a routing signal;

detection means responsive to said control signal for recovering from said composite spectrum selected segments of said information channel in accordance with said control signal;

storage means for storing the selected segments of said information channels;

a memory array having a plurality of storage buffers;

transfer means responsive to said control signal for transferring individual ones of said selected information segments to respective ones of said storage buffers in accordance with said control signal; and memory access and distribution means responsive to the routing signals for accessing said storage buffers and distributing the selected information segments stored therein to ones of said aircraft.

15. The video server as recited in claim 14 further comprising:

aircraft detection means for receiving a data channel and a control signal channel from said aircraft.

16. A system for distributing program material to a first storage device located on an aircraft for subsequent inflight playback, said system for distributing program material comprising:

apparatus for combining time compressed program material into a composite signal in response to a request from said aircraft for program material;

a transmitter, coupled to said apparatus and adapted to be coupled to a first communication link, for transmitting said composite signal to an airport on said first communication link;

a receiver, adapted to be coupled to said first communication link, for receiving said composite signal;

a second storage device, coupled to said receiver, for storing said composite signal; and a second communication link for coupling said composite signal from said second storage device to said first storage device for subsequent inflight playback.

* * * * *